United States Patent [19]
Yu

[11] Patent Number: 5,993,520
[45] Date of Patent: Nov. 30, 1999

[54] ELECTRONIC DUST COLLECTING TYPE AIR PURIFIER

[76] Inventor: Chi-Chin Yu, No. 601, Pa Te Road, Sec. 4, Taipei, Taiwan

[21] Appl. No.: 09/014,035

[22] Filed: Jan. 27, 1998

[51] Int. Cl.⁶ ...................................................... B03C 3/12
[52] U.S. Cl. ............................ 96/66; 96/78; 96/84; 96/98
[58] Field of Search .................................. 96/59, 66, 75, 96/84, 88, 92, 96–100, 77, 78

[56] References Cited

U.S. PATENT DOCUMENTS

| | | | |
|---|---|---|---|
| 3,073,094 | 1/1963 | Landgraf et al. | 96/66 |
| 3,999,964 | 12/1976 | Carr | 96/59 |
| 4,244,710 | 1/1981 | Burger | 96/97 X |
| 5,055,115 | 10/1991 | Yikai et al. | 96/97 X |
| 5,108,470 | 4/1992 | Pick | 96/66 X |
| 5,330,559 | 7/1994 | Cheney et al. | 96/99 X |
| 5,405,434 | 4/1995 | Inculet et al. | 96/88 X |
| 5,573,577 | 11/1996 | Joannov | 96/96 X |
| 5,647,890 | 7/1997 | Yamamoto | 96/59 X |
| 5,807,425 | 9/1998 | Gibbs | 96/99 X |
| 5,846,302 | 12/1998 | Putro | 96/66 |
| 5,855,653 | 1/1999 | Yamamoto | 96/66 X |

*Primary Examiner*—Richard L. Chiesa
*Attorney, Agent, or Firm*—Bacon & Thomas PLLC

[57] ABSTRACT

An electronic dust collecting type air purifier which includes a dust collecting device, which includes a plurality of electrically insulative trays arranged in a stack, a plurality of filter beds made from metal wire coils and respectively mounted in the trays, and an anion generating apparatus having an input terminal connected to one filter bed to receive electrons from it and an output terminal for discharge of electricity into the air to produce anions for gathering dust, the filter beds, except the one which is connected to the anion generating apparatus, being connected to the grounding terminal.

6 Claims, 3 Drawing Sheets

5,993,520

ELECTRONIC DUST COLLECTING TYPE AIR PURIFIER

BACKGROUND OF THE INVENTION

The present invention relates to an electronic dust collecting type air purifier, and more particularly to such an air purifier which comprises an anion generating apparatus, and a dust collecting device connected to the input terminal of the anion generating apparatus. The dust collecting device comprises a plurality of separated filter beds made from metal wire coils. One filter bed is connected to the input terminal of the anion generating apparatus to provide the necessary electrons. Anions are produced in the air and the dust collecting device when the air purifier is operated, and dust is collected by static electricity.

Regular electronic dust collection type air purifiers commonly use a potential difference to produce a corona discharge, and an ionized metal wire to ionize air particles, causing air particles to carry positive charge, so that air particles can be adhered to high voltage dust collecting boards or grounded dust collecting boards. This main drawback of these electronic dust collecting type air purifiers is that the ionized metal wire breaks quickly with use due to oxidation. There are known other electronic dust collection type air purifiers that use charge static fibers to absorb air particles that carry reversed charge. These air purifiers are still not satisfactory in function because static electricity disappears when air particles and charge static fibers are neutralized. Furthermore, a short circuit or leakage of electricity tends to occur in the prior art electronic dust collection type air purifier when a certain amount of air particles are gathered at the dust collecting boards.

SUMMARY OF THE INVENTION

The present invention has been accomplished to provide an electronic dust collection type air purifier which eliminates the aforesaid drawbacks. According to one aspect of the present invention, the input terminal of an anion generating apparatus is connected to an ionic cavity in a dust collecting device to substitute a current limit resistor, one metal wire filter bed of the dust collecting device is connected to the input terminal of the anion generating apparatus to provide the necessary electrons, the other metal wire filter beds of the dust collecting device are connected to the grounding terminal to absorb electrons. When the positive charge at the filter bed which is connected to the anion generating apparatus and the negative charge at the filter beds which are connected to the grounding terminal reach a certain high level, negative charge is discharged from the respective filter beds, causing an ionic cavity to be produced between two adjacent filter beds for gathering air particles. According to another aspect of the present invention, the anion generating apparatus has an output terminal controlled to discharge charge continuously, causing anions to be produced to neutralize air particles. According to still another aspect of the present invention, the filter beds are simply connected to the input terminal of the anion generating apparatus or the grounding terminal, therefore a contact of high voltage is prohibited.

DETAILED DESCRIPTION OF THE PREFERRED EMBODIMENT

Figure 1:
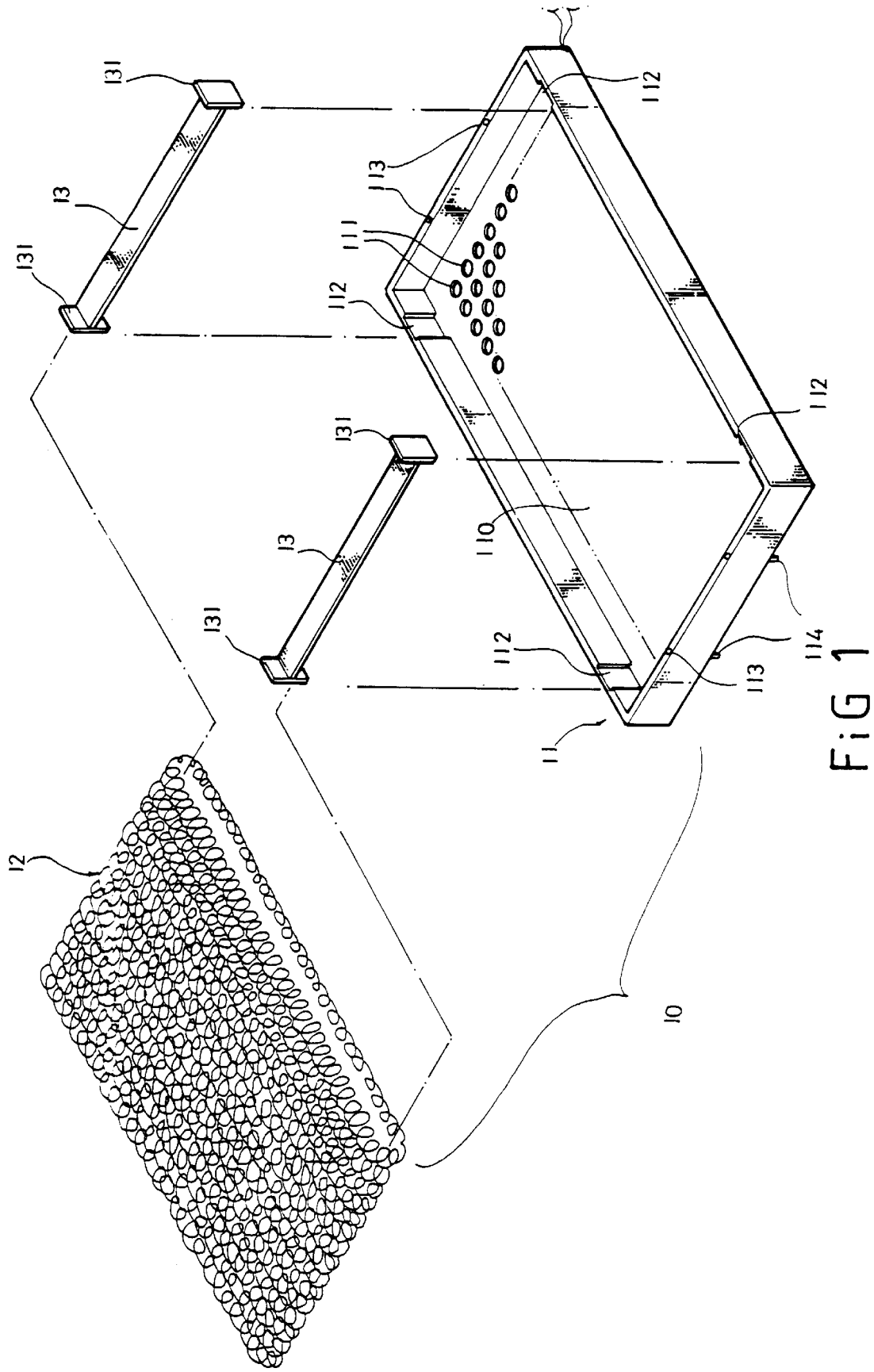
FIG. 1 is an exploded view of a part of the dust collecting device for an air purifier according to the present invention.

Referring to FIG. 1, an air purifier in accordance with the present invention comprises a dust collecting device 10. The dust collecting device 10 comprises a main tray 11. The main tray 11 comprises a receiving open chamber 110, a plurality of through holes 111 at the bottom side of the receiving open chamber 110, two pairs of vertical coupling grooves 112 symmetrically disposed within the receiving open chamber 110 at two opposite sides, a plurality of top recessed holes 113 spaced around the receiving open chamber 110, and a plurality of bottom mounting rods 114 corresponding to the top recessed holes 113.

Referring to FIG. 1 again, a filter bed 12 is mounted in the receiving open chamber 110 of the main tray 11. The filter bed 12 is made from metal wire coils, having a flat shape. Two transverse locating rods 13 are transversely inserted through two opposite ends of the filter bed 12, and mounted in the receiving open chamber 110 of the main tray 11 to hold the filter bed 12 in a stretched condition, having each two vertical coupling end pieces 131 respectively coupled to the vertical coupling grooves 112 inside the main tray 11.

Figure 2:
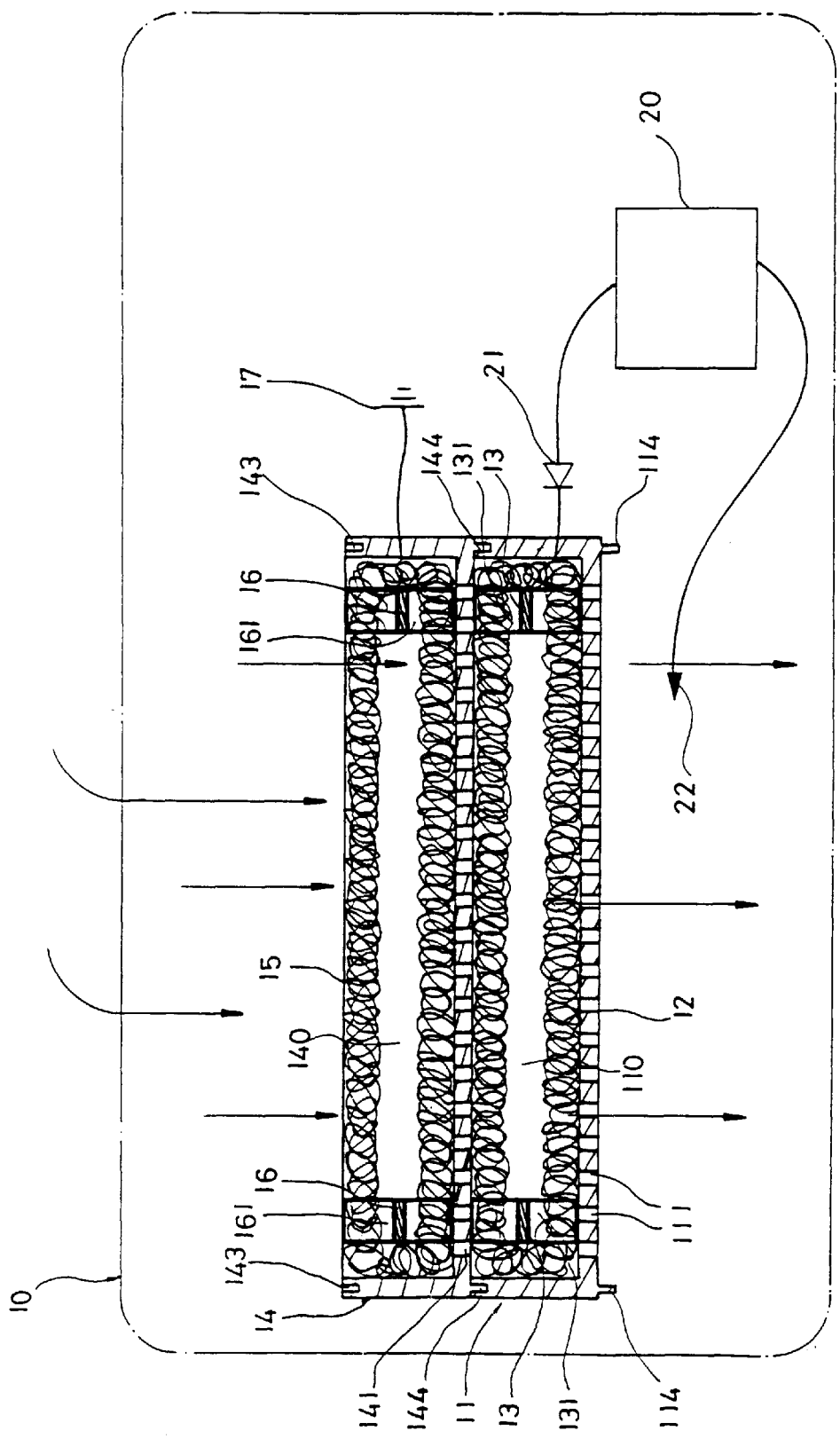
FIG. 2 is a sectional view of a dust collecting device for an air purifier according to the present invention, showing one sub-tray arranged at one side of the main tray.

Referring to FIG. 2, the filter bed 12 in the main tray 11 is connected to an input terminal 21 of an anion generating apparatus 20. The anion generating apparatus 20 has an output terminal 22 for discharge of electricity. The anion generating apparatus 20 comprises a voltage multiplier (not shown). The voltage multiplier is comprised of a plurality of diodes and capacitors, and controlled to multiply the voltage of input power supply to the desired level for discharging through the output terminal 22 into the air to produce anions. As the voltage multiplier is of the known art and not within the scope of the present invention, it is not described in detail.

Referring to FIG. 2 again, a first sub-tray 14 is connected to one side namely the top side of the main tray 11. The first sub-tray 14 is similar to the main tray 11, comprising a receiving open chamber 140, a plurality of through holes 141 at the bottom side of the receiving open chamber 140, two pairs of vertical coupling grooves symmetrically disposed within the receiving open chamber 140 at two opposite sides, a plurality of top recessed holes 143 spaced around the receiving open chamber 140, and a plurality of bottom mounting rods 144 corresponding to the top recessed holes 143. The first sub-tray 14 holds a filter bed 15, which is secured to the receiving open chamber 140 by two transverse locating rods 16. The transverse locating rods 16 have respective end pieces 161 respectively coupled to the vertical coupling grooves inside the receiving open chamber 140. By plugging the bottom mounting rods 144 of the first sub-tray 14 into the top recessed holes 113 on the main tray 11, the main tray 11 and the first sub-tray 14 are connected in a rack.

Figure 3:
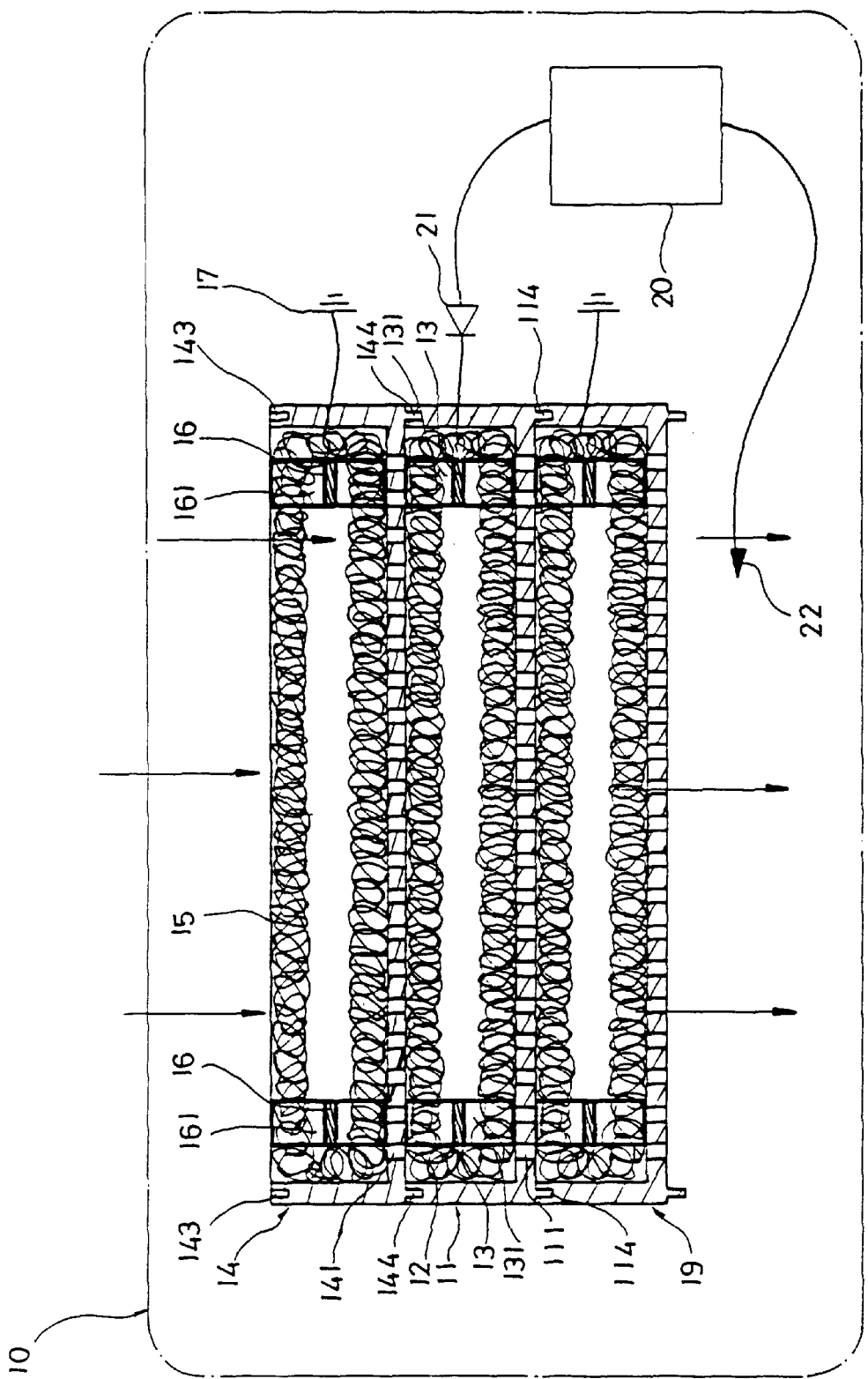
FIG. 3 is a sectional view of an alternate form of the dust collecting device according to the present invention, showing two sub-trays arranged at two opposite sides of the main tray.

Referring to FIG. 3, a second sub-tray 19 is connected to one side namely the bottom side of the main tray 11 opposite to the first sub-tray 14. The structure of the second sub-tray 19 is same as the first sub-tray 14. The metal filter beds 15 of the first sub-tray 14 and second sub tray 19 are respectively connected to the grounding terminal 17, so that an electric field is induced between the main tray 11 and the sub-tray 14 or 19.

Referring to FIGS. 2 and 3 again, the input terminal 21 of the anion generating apparatus 20 is connected to the filter bed 12 in the main tray 11 to receive electrons from it; the filter bed 15 in the sub-tray 14 or 19 is separated from the filter bed 12 in the main tray 11. Because the filter bed 12 continuously discharge electrons to the anion generating apparatus 20, positive charges are accumulated at the filter bed 12, causing an electric charge induction to be produced between the filter bed 12 in the main tray 11 and the filter bed 15 in the sub-tray 14 or 19. Therefore, the filter bed 15 continuously absorbs electrons from the grounding terminal 17, forming a negative charge carrying filter bed. After electric charges have been accumulated to a certain amount, negative charges are discharged out of the metal wire coils of the filter bed 15 in the sub-tray 14 or 19, thereby causing an ionic cavity to be formed between the filter bed 12 in the main tray 11 and the filter bed 15 in the sub-tray 14 or 19. The ionic cavity substitutes the current limit resistor of the anion generating apparatus 20, and achieves a satisfactory static dust collection effect.

The voltage multiplier of the anion generating apparatus 20 multiplies the voltage of input power supply, causing the anion generating apparatus 20 to discharge electricity through its output terminal 22, causing anions to be produced in the air. Because the filter bed 12 continuously supplies electrons to the anion generating apparatus 20, electrons are reduced at the filter bed 12, causing the filter bed 12 to carry positive charge. Due to the induction of positive charge from the filter bed 12 in the main tray 11, the filter bed 15 in the sub-tray 14 or 19 continuously absorbs electrons from the grounding terminal 17. Because of accumulation of electrons, the filter bed 15 in the sub-tray 14 or 19 carries negative charge. Therefore an electric field is produced between the filter beds 12 and 15 to catch dust from the air.

Because the anion generating apparatus 20 continuously discharge electricity through its output terminal 22 to produce anions in the air, the positive potential at the filter bed 12 in the main tray 11 is continuously increased, and the negative potential at the filter bed 15 in the sub-tray 14 or 19 is also continuously increased. When the positive potential at the filter bed 12 in the main tray 11 and the negative potential at the filter bed 15 in the sub-tray 14 or 19 are respectively increased to a certain level, the air in the space between the filter beds 12 and 15 is electrically charged, thereby causing a loop of electron current to be produced. Therefore, when particle pollutant passes through the ionic cavity between the filter beds 12 and 15, it will be directly adhered to the filter bed 15 in the sub-tray 14 or 19, or forced to carry electric charge and then to be adhered to the other filter beds.

Because the filter bed 15 continuously absorbs electrons from the grounding terminal 17, the intensity of the electric field between the filter beds 12 and 15 is maintained at a high level, and the electric field is capable of passing through the particles accumulated at the surface of the filter beds 12 and 15 freely. Therefore, the dust collecting device 10 achieves a satisfactory dust collecting effect. Further, because the filter beds 12 and 15 are simply connected to the grounding terminal or the input terminal of the anion generating apparatus, a contact of high voltage is prohibited.

While only one embodiment of the present invention has been shown and described, it will be understood that various modifications and changes could be made thereunto without departing from the spirit and scope of the invention disclosed.

What the invention claimed is:

1. An electronic dust collecting air purifier comprising:

a dust collecting device, said dust collecting device comprising a plurality of electrically insulative trays arranged in a stack, said trays comprising each a receiving open chamber, a plurality of through holes at a bottom side of said receiving open chamber, and a plurality of coupling grooves symmetrically disposed in said receiving open chamber at two opposite sides;

a plurality of electrically conductive filter beds respectively mounted in the receiving open chambers of said trays, said filter beds comprising each two transverse locating rods at two opposite ends respectively coupled between the coupling grooves in said trays, one of said filter beds being connected to an input terminal of an anion generating apparatus and the others of said filter beds being connected to a grounding terminal; and an anion generating apparatus having an input terminal connected to one of said filter beds to receive electrons from it, and an output terminal for discharge of electricity into the air to produce anions.

2. The electronic dust collecting air purifier of claim 1, said trays have respective male connecting means and female connecting means at two opposite sides for permitting said trays to be connected in a stack by fastening the male connecting means of one tray to the female connecting means of another.

3. The electronic dust collecting air purifier of claim 1, wherein said anion generating apparatus comprises a voltage multiplier, which is comprised of a plurality of diodes and capacitors and controlled to multiple the voltage of input power supply, causing electricity to be discharged through said output terminal.

4. The electronic dust collecting air purifier of claim 1, wherein said anion generating apparatus is a high voltage source controlled to discharge electricity through said output terminal into the air in inducing anions.

5. The electronic dust collecting air purifier of claim 1, wherein said electrically conductive filter beds are made from metal wire coils.

6. The electronic dust collecting air purifier of claim 1, wherein said trays are electrically insulated from one another.

* * * * *